US009425859B2

(12) United States Patent
Mitchell et al.

(10) Patent No.: US 9,425,859 B2
(45) Date of Patent: Aug. 23, 2016

(54) INTERFERENCE MITIGATION FOR BROADBAND OVER POWER LINE

(75) Inventors: Timothy M. Mitchell, Seattle, WA (US); Anil Kumar, Sammamish, WA (US); Roger C. Vondoenhoff, Federal Way, WA (US); Matthias Beck, Cottbus (DE)

(73) Assignee: The Boeing Company, Chicago, IL (US)

( * ) Notice: Subject to any disclaimer, the term of this patent is extended or adjusted under 35 U.S.C. 154(b) by 1454 days.

(21) Appl. No.: 12/911,625

(22) Filed: Oct. 25, 2010

(65) Prior Publication Data

US 2012/0099627 A1    Apr. 26, 2012

(51) Int. Cl.
*H04L 5/16*    (2006.01)
*H04B 3/54*    (2006.01)
(52) U.S. Cl.
CPC ........ *H04B 3/546* (2013.01); *H04B 2203/5445* (2013.01)
(58) Field of Classification Search
USPC ..................................... 307/1, 2, 3, 9.1, 10.1
See application file for complete search history.

(56) References Cited

U.S. PATENT DOCUMENTS

| 2005/0143868 A1* | 6/2005 | Whelan ..................... B61L 3/10 701/1 |
| 2006/0114925 A1* | 6/2006 | Gerszberg ................ H04B 3/54 370/431 |
| 2007/0146128 A1 | 6/2007 | Pumpelly et al. |
| 2008/0224851 A1 | 9/2008 | Pumpelly et al. |
| 2009/0140849 A1 | 6/2009 | Henry |

FOREIGN PATENT DOCUMENTS

| EP | 1956726 A1 | 8/2008 | |
| WO | WO 2008097983 | * 8/2008 | ............. H04B 3/548 |
| WO | WO 2008097983 A1 | * 8/2008 | ............... H04B 3/54 |
| WO | WO2008097983 A1 | 8/2008 | |

OTHER PUBLICATIONS

European Search Report dated Jan. 12, 2012.

* cited by examiner

*Primary Examiner* — Rexford Barnie
*Assistant Examiner* — Xuan Ly
(74) *Attorney, Agent, or Firm* — Toler Law Group, PC

(57) ABSTRACT

Systems and methods to exchange data between a vehicle and a remote computer system, are disclosed. In one embodiment, a system to exchange data between a vehicle and a remote computer system comprises at least one power line adapted to couple to the vehicle, a local area network, a modem coupled to the local area network and the at least one power line, and a power line interference server comprising logic to allocate communication channels within a specified frequency range on the power line. Other embodiments may be described.

22 Claims, 4 Drawing Sheets

INTERFERENCE MITIGATION FOR BROADBAND OVER POWER LINE

BACKGROUND

The subject matter described herein relates to communication networks, and more particularly to offboard communications at airport terminals. Vehicles such as commercial air, marine and land vehicles may include one or more performance monitoring systems that record data regarding various aspects of vehicle operation and performance. For example, the performance data may include a record of performance events that occur during the operation of the vehicle. The performance monitoring system may collect data and report the data to a remote system. Maintenance needs for the vehicle may be determined from the data.

For example, an aircraft may include one or more central maintenance computer(s) (CMC) and/or an aircraft condition monitoring system (ACMS). The central maintenance computer collects, consolidates and reports performance data for the components of the air vehicle. Certain maintenance messages are associated with one or more types of performance data, and are stored in the CMC. When the CMC receives performance data, it analyzes the data to determine if the received data meets the criteria associated with the maintenance messages. An ACMS also collects, monitors, records and reports real-time aircraft system data. For example, the data collected by the ACMS is used to perform cabin pressure and temperature monitoring, hard landing detection, flight crew monitoring, and engine monitoring in addition to many other aircraft performance functions. The reported data may be utilized to analyze aircraft performance and trends in aircraft performance, report significant flight events, and troubleshoot faults.

Data collected and generated by ACMS may be downloaded from the aircraft to a ground-based computer system while the plane is being serviced at a gate. Similarly, data generated by one or more ground-based systems may be uploaded to the aircraft while the plane is being serviced at a gate. Accordingly, systems and methods to download data from and upload data to an aircraft may find utility.

SUMMARY

Embodiments of systems and methods in accordance with the present disclosure may provide a broadband connection over a power line between a vehicle and one or more remote computer systems. In one embodiment a system to exchange data between a vehicle to a remote computer system comprises at least one power line adapted to couple to the vehicle, a local area network, a modem coupled to the local area network and the at least one power line, and a power line interference server comprising logic to allocate communication channels within a specified frequency range on the power line.

In another embodiment, a method to exchange data between a vehicle to a remote computer system comprises coupling at least one power line to the vehicle, coupling a modem to the power line and to a local area network, and allocating one or more communication channels within a specified frequency range on the power line and exchanging data between the vehicle on the one or more communication channels.

In yet another embodiment, a computer program product stored a tangible computer readable medium comprising logic instructions which, when executed by a process, configure the process to facilitate the exchange of data between a vehicle and a remote computer system by performing operations comprising allocating one or more communication channels within a specified frequency range on a power line which couples a modem to the vehicle, and exchanging data between the vehicle and a remote computer system on the one or more communication channels.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

Embodiments of methods and systems in accordance with the teachings of the present disclosure are described in detail below with reference to the following drawings.

DETAILED DESCRIPTION

Systems and methods for vehicle condition monitoring and reporting are described herein. Specific details of certain embodiments are set forth in the following description and figures to provide a thorough understanding of such embodiments. One skilled in the art will understand, however, that alternate embodiments may be practiced without several of the details described in the following description.

Various embodiments described here are set in the context of downloading data from and uploading data to an aircraft over a broadband connection implemented on a power line coupled to the aircraft. By way of example, commercial aircraft are commonly coupled to a power line to provide electrical power to the aircraft when the aircraft is stationed at a gate at an airport. Electrical power may be used to power electrical systems on the aircraft while the aircraft is at the gate and/or to charge battery systems on the aircraft. One skilled in the art will recognize, however, that the systems and methods described herein are not limited to aircraft, but are equally applicable to other vehicles and contexts, e.g., waterborne vessels such as ships or submarines or land-based vehicles such as automobiles, trucks, or military vehicles. As used herein, the term "vehicle" should be construed to include any of these vehicles.

Figure 1:
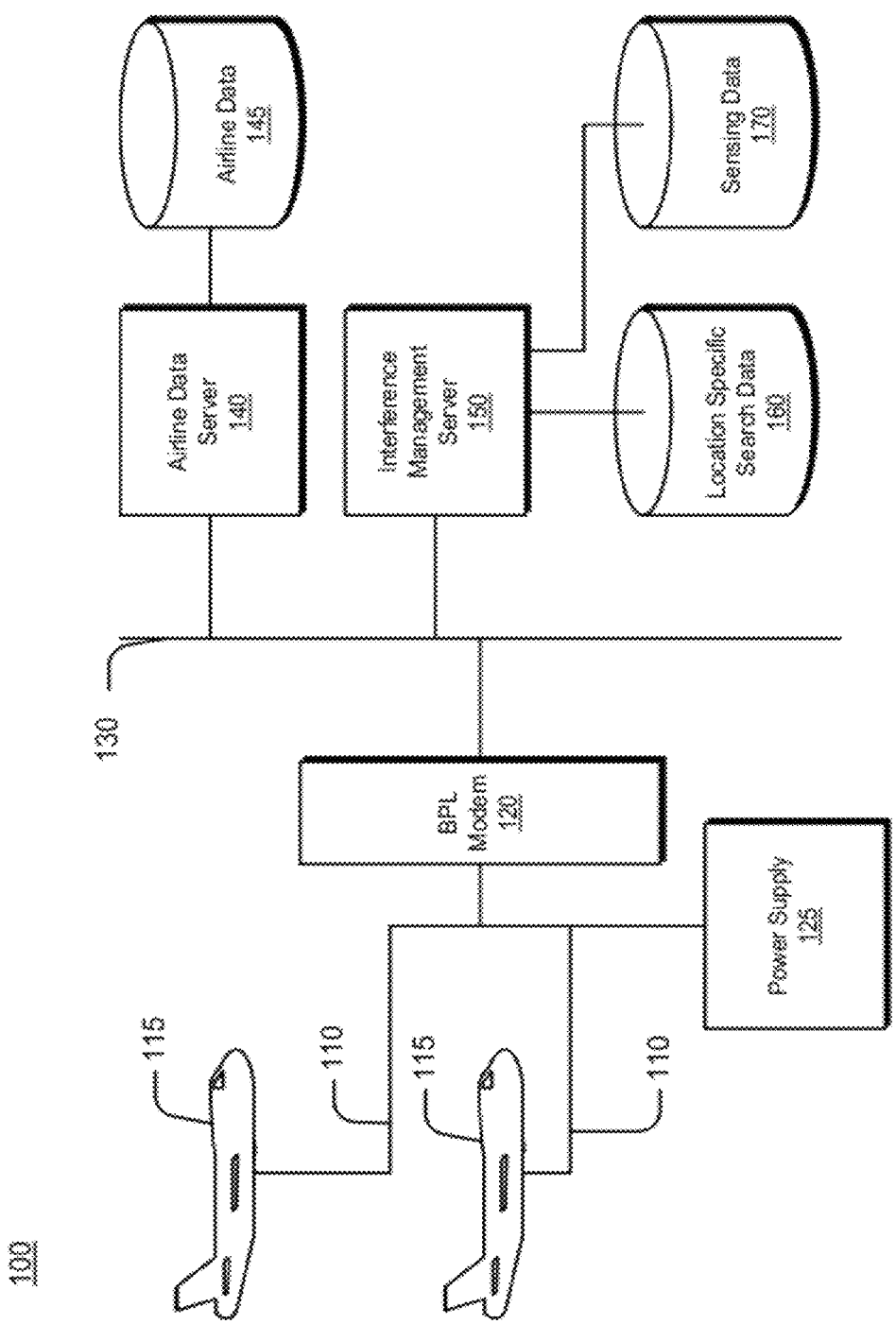
FIG. 1 is a schematic illustration of a system for interference mitigation for broadband communication over power lines according to embodiments.

FIG. 1 is a schematic illustration of a system for interference mitigation for broadband communication over power lines according to embodiments. Referring to FIG. 1, in one embodiment a power supply 125 is coupled to one or more vehicles 115 via a power line(s) 110. The system 100 comprises a broadband over power line (BPL) modem 120 which may be coupled to one or more vehicles, e.g., aircraft 115, via the one or more power lines 110. BPL modem 120 also couples to a communication network 130. An airline data server 140 and an interference management server 150 are coupled to communication network 130. Airline data server 140 may be coupled to a data store for airline data 145.

Interference management server 150 may be coupled to a data store for location specific search data 160 and a data store for sensing data 170.

In some embodiments the power supply 125 may be implemented as an alternating current (AC) power source which supplies 3-phase electrical power at a frequency of approximately 400 Hz. One or more transformers may be provided to step-down the electrical power from a higher voltage (e.g., 380V) to 115 VAC. The power lines 115 may be embodied as shielded wire cables capable of carrying at least 225 amperes (A) per aircraft 115.

Communication network 130 may be embodied as a as a Personal Area Network (PAN), Local Area Network (LAN), Metropolitan Area Network (MAN) or a Wide Area Network (WAN) or the like. Furthermore, communication network 220 may comprise one or more sub-networks. By way of example, and not by limitation, communication network 130 may comprise one or more access points (APs) that establish access to a LAN or directly to a backbone network such as the Internet. Additionally, the communication network 130 may include a variety of input/output transports such as, but not limited to; wired USB or serial links, Wireless 802.11x link, wireless USB, Blue-tooth, infra red link or the like.

BPL modem 120 may be embodied as a processor-based device which converts communication signals from one or more signal formats used on the communication network to a signal format for use on power lines 110, and vise-versa. In some embodiments BPL modem 120 converts signals from communication network 130 into analog signals operating in a frequency range between about 1.7 MHz and 80 MHz, which encompasses the frequency ranges commonly referred to as the MF, HF, and VHF frequency ranges. In some embodiments one or more sub-ranges within these frequency ranges may be used. By way of example, a sub range from about 30 MHz to 50 MHz is relatively free from external interference in most airport environments in the world.

Airline data server 140 may be embodied as a computer-based device coupled to the communication network 130. In some embodiments the airline data server 140 may be associated with one or more central maintenance computer(s) (CMC) and/or an aircraft condition monitoring system (ACMS), which may download performance data from the aircraft 115, process the data, and generate one or more alerts. In addition, the airline data server 140 may store data collected from the aircraft 115 in the airline data store 145, and may upload data to the aircraft 115.

Interference management server 150 may be embodied as a computer-based device coupled to the communication network 130. In some embodiments the interference management server 150 is coupled to a location specific search data store 160 which contains data relating to local sources of interference in the frequency range over which the BPL modem 120 transmits signals on the power lines 110. The interference management server 150 may also be coupled to a sensing data store 170 which contains data relating to interference parameters collected by a sensing routines used to detect interference in the frequency range over which the BPL modem 120 transmits signals on the power lines 110.

Figure 2:
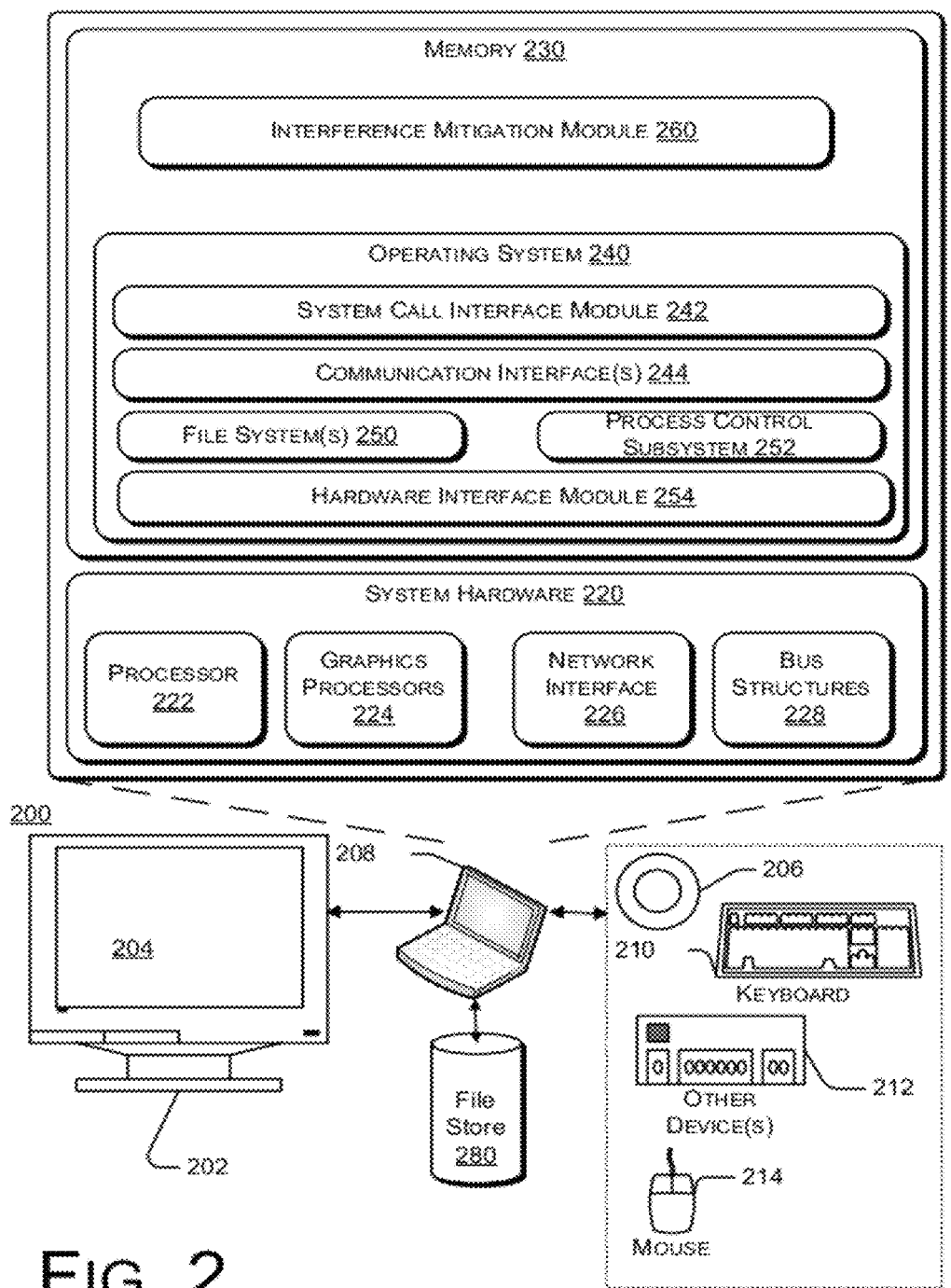
FIG. 2 is a schematic illustration of a computing device which may be adapted to implement a system and method for vehicle condition monitoring and reporting in accordance with some embodiments.

In some embodiments the interference management server 150 depicted in FIG. 1 may be implemented in a computer system environment. FIG. 2 is a schematic illustration of a computing system 200 which may be adapted to implement an interference management server 150 in accordance with some embodiments. In one embodiment, system 200 includes a computing device 208 and one or more accompanying input/output devices including a display 202 having a screen 204, one or more speakers 206, a keyboard 210, one or more other I/O device(s) 212, and a mouse 214. The other I/O device(s) 212 may include a touch screen, a voice-activated input device, a track ball, and any other device that allows the system 200 to receive input from a user.

The computing device 208 includes system hardware 220 and memory 230, which may be implemented as random access memory and/or read-only memory. A file store 280 may be communicatively coupled to computing device 208. File store 280 may be internal to computing device 108 such as, e.g., one or more hard drives, CD-ROM drives, DVD-ROM drives, or other types of storage devices. File store 180 may also be external to computer 208 such as, e.g., one or more external hard drives, network attached storage, or a separate storage network.

System hardware 220 may include one or more processors 222, a graphics processor(s) 224, network interfaces 226, and bus structures 228. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 224 may function as adjunct processors that manage graphics and/or video operations. Graphics processor(s) 224 may be integrated onto the motherboard of computing system 200 or may be coupled via an expansion slot on the motherboard.

In one embodiment, network interface 226 could be a wired interface such as an Ethernet interface (see, e.g., Institute of Electrical and Electronics Engineers/IEEE 802.3-2002) or a wireless interface such as an IEEE 802.11a, b, g or n-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 228 connect various components of system hardware 220]. In one embodiment, bus structures 228 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 230 may include an operating system 240 for managing operations of computing device 208. In one embodiment, operating system 240 includes a hardware interface module 254 that provides an interface to system hardware 220. In addition, operating system 240 may include a file system 250 that manages files used in the operation of computing device 208 and a process control subsystem 252 that manages processes executing on computing device 208.

Operating system 240 may include (or manage) one or more communication interfaces that may operate in conjunction with system hardware 220 to transceive data packets and/or data streams from a remote source. Operating system 240 may further include a system call interface module 242 that provides an interface between the operating system 240 and one or more application modules resident in memory 130. Operating system 240 may be embodied as a Windows® brand operating system or as a UNIX operating system or any derivative thereof (e.g., Linux, Solaris, etc.), or other operating systems.

Figure 3:
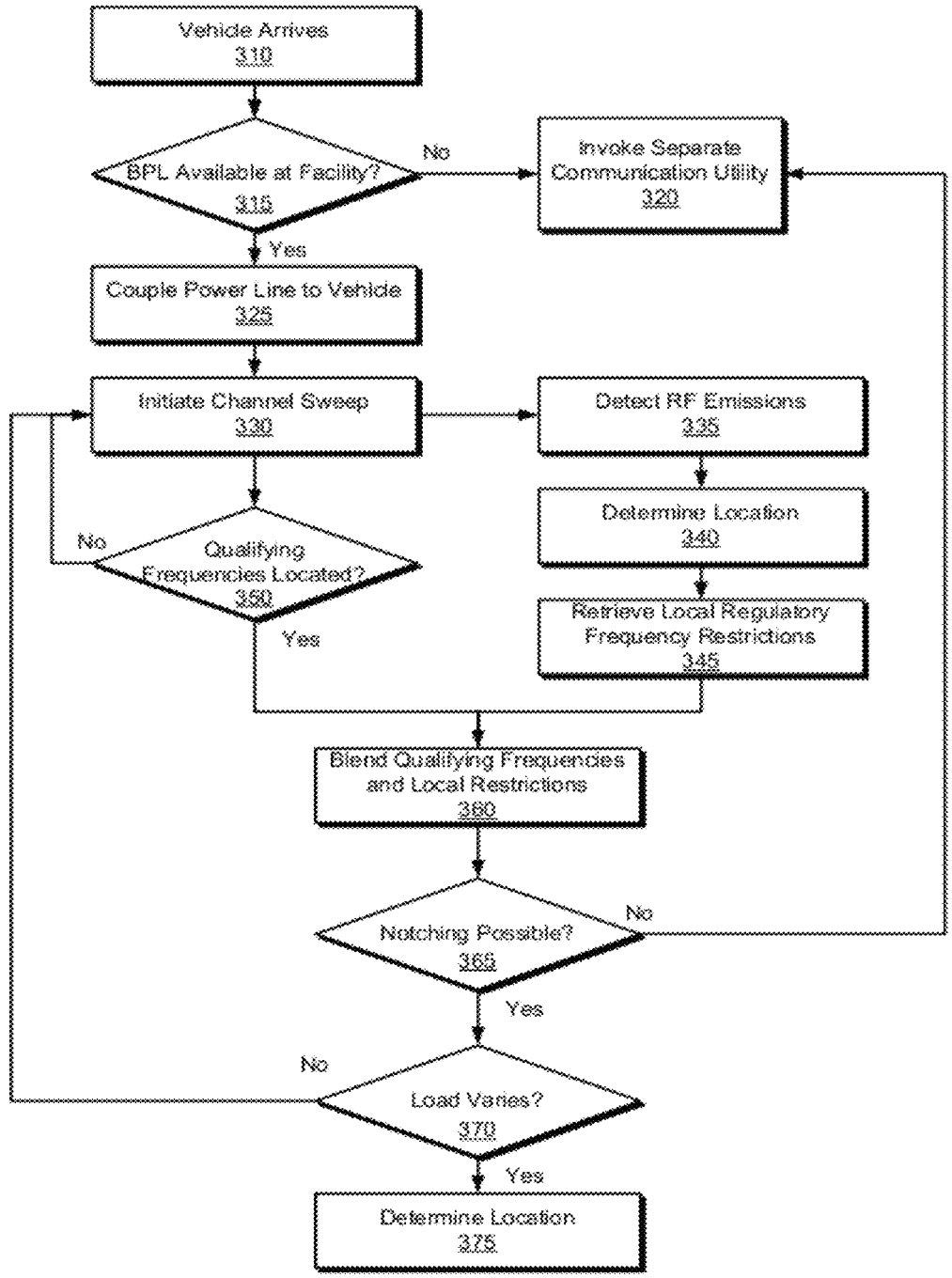
FIG. 3 is a flowchart illustrating operations in a method for interference mitigation for broadband communication over power lines according to embodiments.

In one embodiment, memory 230 includes an interference mitigation module 260, which may include logic instructions encoded in a computer-readable medium which, when executed by processor 222, cause the processor 222 to manage data transmission on the power lines 110 in a way that mitigates interference in the local environment. FIG. 3 is a flowchart illustrating operations in a method for interference mitigation for broadband communication over power lines according to embodiments. In some embodiments the interference mitigation module 260 may implement (or initiate) the operations depicted in FIG. 3 to manage data transmission on the power lines 110 in a way that mitigates interference in the local environment.

Referring now to FIG. 3, at operation 310 a vehicle arrives at a facility. By way of example, in one embodiment an aircraft 115 may arrive at an airport. If, at operation 315, a broadband over power line connection is not available at the airport, then control passes to operation 320 and a separate communication utility may be invoked to pass data between the aircraft 115 and a remote computer system. By contrast, if at operation 315 a broadband over power line connection is available at the airport, then at operation 325 the power line 110 is coupled to the aircraft.

At operation 330 a channel sweep is initiated to search the bandwidth allocated for the communication link for the communication channels which provide the best available transmission conditions. In some embodiments the channel sweep may be initiated by the interference mitigation module 260, but may be implemented by logic in the BPL modem 120. The channel sweep may determine one or more frequency ranges or defined communication channels within the frequency band which exhibit good transmission qualities, e.g., channels which have strong resonance points. The channels may be stored in the sensing data store 170.

In addition, the interference mitigation module 260 may initiate a process to detect local RF emissions. By way of example, an RF scanner may be coupled to interference management server to scan the local environment for RF sources. The RF scanner may collect information pertaining to RF interference sources, e.g., the frequency range of the source (s) and the signal strength of the interference. The data may be stored in the sensing data store 170.

At operation 345 the interference mitigation module may initiate a process to retrieve local regulatory frequency restrictions. By way of example, some localities restrict RF transmissions above specific power thresholds in particular frequency ranges. The frequency ranges and restrictions may be stored in the location specific search data store 160 and may be retrieved from the data store 160.

If, at operation 350, the channel sweep does not identify one or more qualifying frequencies then control passes back to operation 330 and a new channel sweep is initiated. Operation 330 may be repeated until one or more qualifying frequencies are located, at which point control passes to operation 360 and the interference management module 360 implements operations to blend qualifying frequencies with local restrictions determined in operation 345.

In some embodiments the blending operation 360 may comprise a number of sub-operations. The interference management server 150 may retrieve information about location-specific sources of interference from the location-specific search data 160 and may retrieve sensing data for the specific location from the sensing data store 170. The interference management server then allocates available bandwidth on the power lines 110 to implement one or more interference mitigation strategies to reduce interference with existing RF sources operating in the frequency range selected for transmission over the power lines 110.

In some embodiments the interference management server 150 may implement an interference management technique referred to as a "search and avoid" strategy which relies only on the location specific search data 160. In a search and avoid strategy the interference management server 150 retrieves the restricted frequency ranges marked as interference sources in the location specific search data 160 and marks those frequency ranges as excluded for communication transmissions between the BPL modem 120 and the aircraft 115. The excluded frequency ranges may be transmitted to the BPL modem 120, which blocks out the excluded frequency ranges.

In other embodiments the interference management server 150 may implement an interference management technique referred to as a "search, sense, and avoid" technique. In this technique the interference management server 150 retrieves the restricted frequency ranges marked as interference sources in the location specific search data 160 and marks those frequency ranges as excluded for communication transmissions between the BPL modem 120 and the aircraft 115. In addition, the interference management server 150 cooperates with the BPL modem 120 to detect the presence of other radio communication services transmitting on the power lines 110 and to block new transmissions on frequency ranges that are already being used.

The mitigation strategies may use either static notching techniques or dynamic notching techniques to block frequency ranges. Static notching techniques completely block out frequency ranges from transmission between the BPL modem 120 and the aircraft 115. By contrast, dynamic frequency notching techniques use both search and sense techniques to dynamically notch user frequencies over time in response to changing interference conditions. In some embodiments a combination of static and dynamic techniques may be used. For example, frequencies which are used by aviation applications may be statically notched, thereby precluding the possibility of interference from communication over the power line between the BPL modem 120 and the aircraft 115 over the power line 110, while frequencies which are used by other aircraft 115 or other applications may be dynamically notched.

Figure 4:
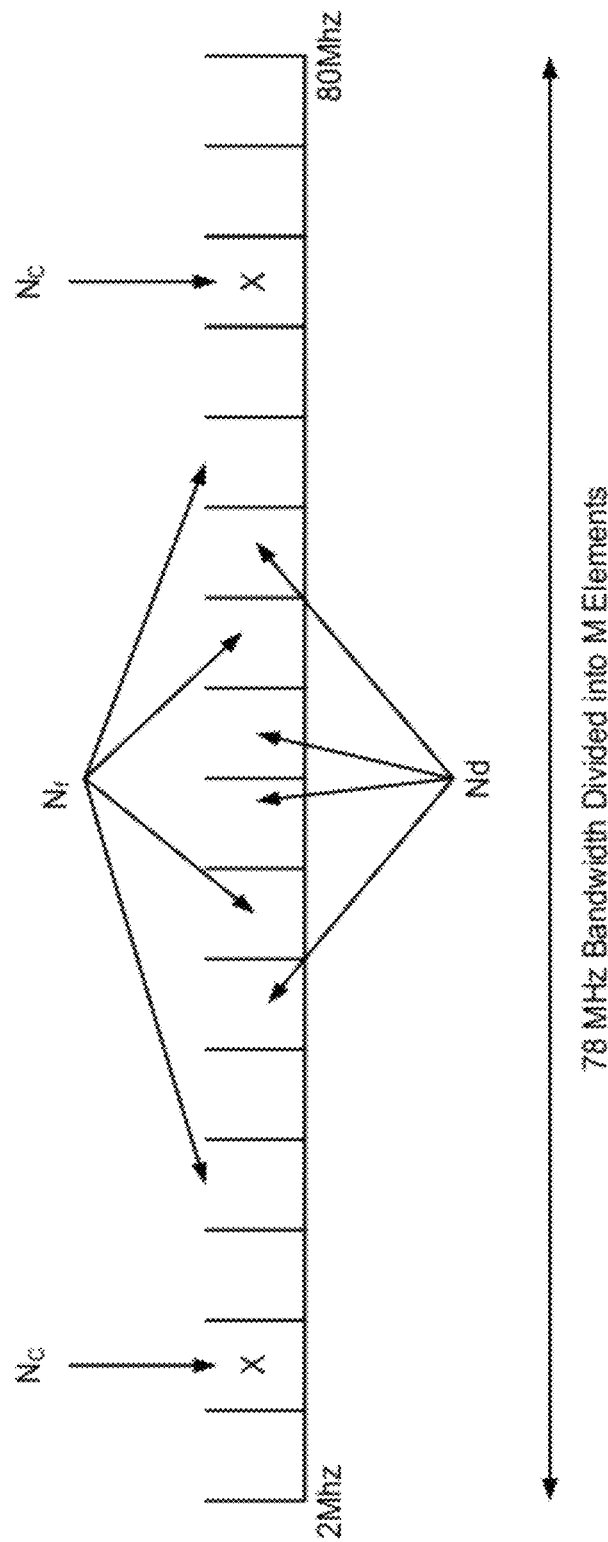
FIG. 4 is a frequency diagram illustrating aspects of a frequency allocation algorithm, according to embodiments.

In some embodiments the frequency allocation algorithm implemented by the interference management server 150 may allocate the frequency resources available on the power line 110 between dynamically notched frequencies and statically notched frequencies. FIG. 4 is a frequency diagram illustrating aspects of a frequency allocation algorithm, according to embodiments. Referring to FIG. 4, in some embodiments the 78 MHz bandwidth is divided into a number of elements, M. Some number of the elements, $N_c$, may be unavailable for use as a communication channel due to channel imperfections. Some number of elements, $N_f$, may be statically notched due to local restrictions on interference. Some number of elements, $N_d$, may be dynamically notched based on sensing data at the specific location.

The interference management server 150 may allocate the available bandwidth such that the number of available elements, M, is maximized for a given time interval. By way of example, if the loss in throughput due to the time lost in collecting sensing data to determine the availability of $N_d$ is greater than the throughput achievable, then the bandwidth allocation routine may cease sensing and the elements $N_d$ may be placed into the pool of bandwidth which is statically notched, $N_f$. Similarly, if the ambient noise level at a particular frequency is high then any RF interference generated by the BPL modem 120 is relatively unimportant. Thus, in some embodiments if the ambient noise level at a particular frequency exceeds a threshold, e.g., −95 dBm, based on average measurements then the frequency may be included for transmission by the BPL modem 120.

In the foregoing discussion, specific implementations of exemplary processes have been described, however, it should be understood that in alternate implementations, certain acts need not be performed in the order described above. In alternate embodiments, some acts may be modified, performed in a different order, or may be omitted entirely, depending on the circumstances. Moreover, in various alternate implementations, the acts described may be implemented by a computer, controller, processor, programmable device, firmware, or any other suitable device, and may be based on instructions stored on one or more computer-readable media or otherwise stored or programmed into such devices (e.g. including transmitting computer-readable instructions in real time to such devices). In the context of software, the acts described above may represent computer instructions that, when executed by one or more processors, perform the recited operations. In the event that computer-readable media are used, the computer-readable medium can be any available medium that can be accessed by a device to implement the instructions stored thereon.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system comprising:
   a modem coupled to a power line, the power line adapted to couple a vehicle with a remote computer via a communication network; and
   a power line interference server,
   wherein the power line interference server is configured to dynamically determine whether a first set of portions of a specified frequency range are unavailable for communication channels,
   wherein the power line interference server is configured to determine a throughput available on a first portion of the first set of portions and to add a frequency range corresponding to the first portion of the first set of portions to frequency data from a database in response to the throughput not satisfying a throughput threshold,
   wherein the power line interference server is configured to cease dynamically determining whether the first portion is unavailable for communication channels in response to the throughput not satisfying the throughput threshold, and
   wherein the power line interference server comprises logic to allocate communication channels within a specified frequency range on the power line for the vehicle to communicate with the remote computer within the specified frequency range after the power line interference server ceases to dynamically determine whether the first portion is unavailable for communication channels.

2. The system of claim 1,
   wherein the power line interference server is configured to determine an ambient noise level on a second portion of the first set of portions, and
   wherein the power line interference server is configured to allocate a first communication channel of the communication channels within the second portion in response to the ambient noise level satisfying a threshold noise level.

3. The system of claim 1, wherein the power line interference server is configured to determine a second set of portions of the specified frequency range that is unavailable for communication channels based on the frequency data, and wherein the first set of portions is distinct from the second set of portions.

4. The system of claim 3,
   wherein the database includes location specific information identifying a plurality of frequency regulations corresponding to a plurality of locations.

5. The system of claim 4,
   wherein a first frequency regulation of the plurality of frequency regulations indicates that a first particular frequency range is unavailable for communication channels at a first location of the plurality of locations,
   wherein a second frequency regulation of the plurality of frequency regulations indicates that a second particular frequency range is unavailable for communication channels at a second location of the plurality of locations,
   wherein the first frequency range is different from the second frequency range, and
   wherein the first location is distinct from the second location.

6. The system of claim 3, wherein the second set of portions includes a particular frequency range used for communication by an aviation application.

7. The system of claim 1, wherein the specified frequency range extends from 1.7 MHz to 80 MHz.

8. A method comprising:
   dynamically determining, at a power line interference server, whether a first set of portions of a specified frequency range on a power line, which couples a modem to a vehicle for the vehicle to communicate with a remote computer system via a communication network, are unavailable for a communication channel;
   determining a throughput available on a first portion of the first set of portions, wherein the power line interference server ceases to dynamically determine whether the first portion is unavailable for the communication channel in response to the throughput not satisfying a throughput threshold;
   adding a frequency range corresponding to the first portion of the first set of portions to frequency data from a database in response to the throughput not satisfying the throughput threshold;
   allocating the communication channel within a second portion of the first set of portions after ceasing to dynamically determine whether the first set of portions is unavailable for the communication channel, wherein the second portion is dynamically determined to be available for the communication channel; and
   exchanging data between the vehicle and the remote computer system on the allocated communication channel.

9. The method of claim 8, wherein the specified frequency range extends from 1.7 MHz to 80 MHz.

10. The method of claim 8, further comprising:
    determining a vehicle location of the vehicle; and determining a second set of portions of the specified frequency range that is unavailable for the communication channel based on the vehicle location.

11. The method of claim 8, further comprising determining an ambient noise level on a third portion of the first set of portions, wherein the communication channel is allocated within the third portion in response to the ambient noise level satisfying a threshold noise level.

12. The method of claim 8, further comprising determining a second set of portions of the specified frequency range that is statically unavailable for the communication channel based on the frequency data, wherein the first set of portions is distinct from the second set of portions.

13. The method of claim 12, wherein the second set of portions includes a particular frequency range used for communication by an aviation application.

14. The method of claim 8, further comprising:
   detecting one or more radio communication services transmitting at one or more frequencies in the specified frequency range; and
   transmitting a signal to the modem to block transmission over the power line at the one or more frequencies in the specified frequency range.

15. The method of claim 8, further comprising blocking frequency ranges unavailable for the communication channel by static notching or dynamic notching.

16. A non-transitory computer readable medium storing instructions which, when executed by a processor, cause the processor to perform operations comprising:
   dynamically determining, at a power line interference server, whether a first set of portions of a specified frequency range on a power line, which couples a modem to a vehicle for the vehicle to communicate with a remote computer system via a communication network, are unavailable for a communication channel;
   determining a throughput available on a first portion of the first set of portions, wherein the power line interference server ceases to dynamically determine whether the first portion is unavailable for the communication channel in response to the throughput not satisfying a throughput threshold;
   adding a frequency range corresponding to the first portion of the first set of portions to frequency data in response to the throughput not satisfying the throughput threshold;
   after ceasing to dynamically determine whether the first set of portions is unavailable for the communication channel, allocating the communication channel within a second portion of the first set of portions, wherein the second portion is dynamically determined to be available for the communication channel; and
   exchanging data between the vehicle and the remote computer system on the allocated communication channel.

17. The non-transitory computer readable medium of claim 16, wherein the communication channel is allocated in response to determining that the vehicle is located at a facility that provides a broadband over power line connection, and wherein the operations further comprise, in response to determining that the facility does not provide the broadband over power line connection, exchanging data between the vehicle and the remote computer system using a communication utility distinct from the communication channel.

18. The non-transitory computer readable medium of claim 16, wherein the operations further comprise:
   determining a vehicle location of the vehicle; and
   determining a second set of portions of the specified frequency range that is unavailable for the communication channel based on the vehicle location.

19. The non-transitory computer readable medium of claim 16, wherein the operations further comprise:
   detecting one or more radio communication services transmitting at one or more frequencies in the specified frequency range; and
   transmitting a signal to the modem to block transmission over the power line at the one or more frequencies in the specified frequency range.

20. The non-transitory computer readable medium of claim 16, wherein the operations further comprise receiving data from the vehicle via the communication channel.

21. The non-transitory computer readable medium of claim 20, wherein the operations further comprise determining an ambient noise level on a third portion of the first set of portions, wherein the communication channel is allocated within the third portion in response to the ambient noise level satisfying a threshold noise level.

22. The non-transitory computer readable medium of claim 20, wherein the specified frequency range extends from 1.7 MHz to 80 MHz.

* * * * *